(12) United States Patent
Erlikh et al.

(10) Patent No.: US 6,346,953 B1
(45) Date of Patent: Feb. 12, 2002

(54) METHOD AND SYSTEM FOR RECREATING A USER INTERFACE OF AN EXISTING APPLICATION TEXT BASED USER INTERFACE INTO A GRAPHICAL USER INTERFACE

(75) Inventors: Len Erlikh, Brooklyn, NY (US); Ioan M. Oara, Cary, NC (US); Mikhail Bulyonkov, Morskoj; Audrey N. Terekhov, Petersburg, both of (RU); Vivek Wadhwa, Chapel Hill, NC (US)

(73) Assignee: Relativity Technologies, Cary, NC (US)

( * ) Notice: Subject to any disclaimer, the term of this patent is extended or adjusted under 35 U.S.C. 154(b) by 0 days.

(21) Appl. No.: 09/243,937

(22) Filed: Feb. 4, 1999

(51) Int. Cl.⁷ .................................. G06F 3/00
(52) U.S. Cl. ............... 345/762; 345/765; 345/744; 345/764; 345/709; 345/203; 345/219
(58) Field of Search ............... 345/335, 339, 345/329, 333, 334, 744, 733, 764, 762, 765; 709/203, 219, 328, 319, 313; 703/23, 24, 26

(56) References Cited

U.S. PATENT DOCUMENTS

| | | | | |
|---|---|---|---|---|
| 5,179,700 A | * | 1/1993 | Alhara et al. ............... | 395/650 |
| 5,664,190 A | * | 9/1997 | Cohen et al. ............... | 395/670 |
| 5,673,403 A | * | 9/1997 | Brown et al. ............... | 345/744 |
| 5,774,720 A | * | 6/1998 | Borgendale et al. ........ | 395/682 |
| 5,802,530 A | * | 9/1998 | Van Hoff ..................... | 707/513 |
| 6,064,382 A | * | 3/2000 | Diedrich et al. ............ | 345/744 |

* cited by examiner

Primary Examiner—Raymond J. Bayerl
Assistant Examiner—Cuong T. Thai
(74) Attorney, Agent, or Firm—A. Jose Cortina; Kilpatrick Stockton LLP

(57) ABSTRACT

A method for recreating a user interface of an existing application screen into a graphical user interface having the same functionality of the original interface includes matching the structure data in a user interface of an existing application to a pattern of data structure in the application which communicates with the screen. Portions of the existing program communicating with each screen of the user interface of the existing application, correspondence between fields of a specific screen and the portion of the program which communicates with the specific screen, and statements where the field is compared with other fields and literal values, are detected. The detected information is displayed and from that information a determination made about which fields represent events. The type of graphical user interface control to be used for each event is specified. The text appearing on the graphical user interface for each control is specified. The result of the event is specified. The application user interface is then regenerated as a graphical user interface.

37 Claims, 5 Drawing Sheets

METHOD AND SYSTEM FOR RECREATING A USER INTERFACE OF AN EXISTING APPLICATION TEXT BASED USER INTERFACE INTO A GRAPHICAL USER INTERFACE

CROSS REFERENCE TO RELATED APPLICATIONS

This application is related to copending application Ser. No. 09/245,002 entitled "A Method And System Of Business Rule Extraction From Existing Applications For Integration Into New Applications", which was concurrently filed with this application.

FIELD OF THE INVENTION

This invention relates to a method and system for recreating a user interface of an existing application screen into a graphical user interface having the same functionality of the original user interface. More specifically, the invention relates to a method and system of transforming a program-centric control of a screen into an event-centric graphical user interface capable of use on newer systems and platforms as well as in connection with the original system.

BACKGROUND OF THE INVENTION

In the above referenced copending application there has been described a method and system for extracting business rules in sections of legacy code, such as COBOL programs, as a self contained routine, and translating such routines into more modern systems and platforms such as Java, C++ and even as an HTML page or new COBOL system.

While extraction of such business rules has been described, a further problem arising in legacy applications, such as COBOL, PLI and C, is that they provide a user interface to a user which is program-centric as opposed to event-based modern day graphical interfaces. More particularly, older main frame systems contain buried within the program code, descriptions of screens, but there is no notion of what to do within the screen as is done with modern graphical user interfaces with pointing devices. Previously, such program-centric interface control was done because typically "dumb terminals" were used.

Modern process and graphical user interfaces revolve around events on a screen. Thus, a Windows™ type system provides a number of images such as icons, menus, etc. and to accomplish an event in the system, the user might "left click" on a mouse when the pointer or arrow is superimposed on an icon on the graphical user interface screen. Thus, such modem systems are event driven on how to interact with the screen and not "program-centric" as are the older legacy applications.

For the purposes of this disclosure, it is noted that by the term "user interface" is meant the screen-bound portion of a computing system that provides for interactions (input/output) between the computing system and its user. There are two major properties of the user interface. A first property is the visual layout and content, and the second property is the interface behavior. Visual layout and content defines the "look and feel" of the user interface such as colors, field screen positions, fonts, etc., as well as, the information content of the interface. Interface behavior defines how the system acts upon user request (events) with regard to its interaction with the underlying applications program, as well as the screen to screen transitions.

It is acknowledged that there is a great deal of business knowledge locked into a user interface of the legacy system. It becomes important to leverage this knowledge in moving forward to the new generation of the Irternet/Intranet and Client/Server based systems by extracting all user events relating to legacy application screens, for example, CICS/BMS, IMS/MFS, and AS400 Forms, that can be transformed into modern solutions such as Visual Basic, HTML, Java, and C++.

SUMMARY OF THE INVENTION

In accordance with one aspect of the method of the invention, a user interface is recreated from an existing application screen into a graphical user interface having the same functionality of the original user interface. This is done by matching the structure of data in a user interface of an existing application to a pattern of data structure in the application which communicates with the screen. The portion of the existing program which communicates with each screen of the user interface of the existing application are detected, and correspondence between fields of a specific screen and the portion of the program which communicates with a specific screen is detected. Thereafter, for each screen field, statements where the screen is compared with other fields and literal values are detected, and all of the detected information is displayed for determining therefrom which fields represent events. For each event, the type of graphical interface control to be used is specified along with the text appearing on the graphical user interface for each control specified and the result of the event. The applications user interface is then regenerated as a graphical user interface.

In more specific aspects in accordance with the method, the graphical user interface control specified can be a push button, a menu, or a function key. The result of the event specified can be the transition to another screen, performing of a routine while the screen remains the same, or unloading of the screen. The regeneration of the screen of the user interface can be done, for example, in more modern environments such as a Visual Basic environment, HTML, Java or C++.

In accordance with another aspect of the invention, there is provided a system for recreating a user interface of an existing application screen into a graphical user interface having the same functionality of the original user interface. The system includes components such as programs and computer system portions for effecting the various steps discussed in connection with the method described herein.

BRIEF DESCRIPTION OF THE DRAWINGS

Having briefly described the invention, the same will become better understood from the following discussion, viewed with reference to the appended drawings, wherein.

DETAILED DISCUSSION OF THE INVENTION

Figure 1:
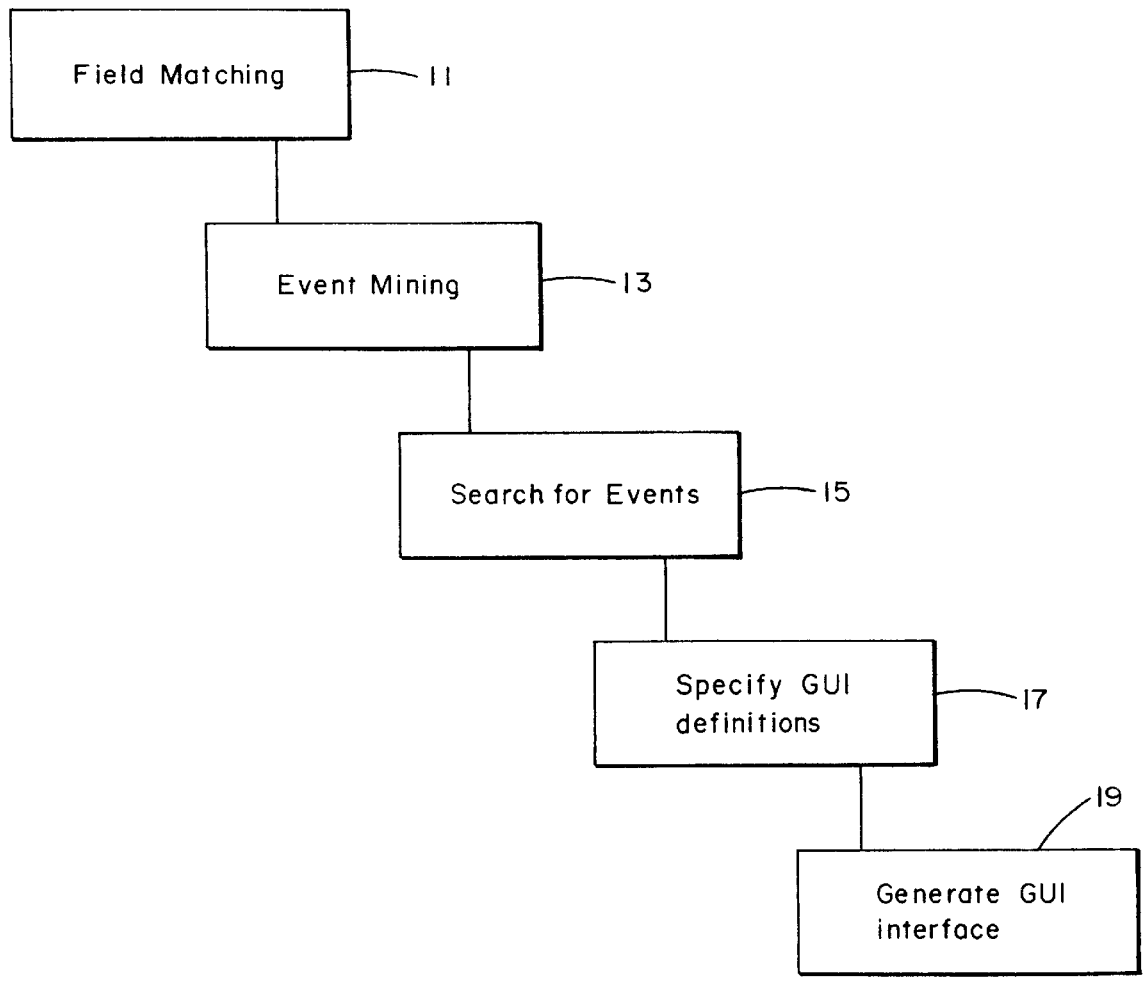
FIG. 1 is a process flow diagram illustrating how all user events relating to legacy application screens are detected for recreating a user interface with the same functionability in a graphical user interface environment in accordance with the invention.

The method and system of the invention can be used to generate a new graphical user interface for existing legacy applications which may be based on COBOL, PL/I or C, for example, as the user interface of such legacy applications. Such applications employ multiple user interface definition languages such as CICS/BMS, IMS/MFS and AS400 Forms. These languages support universal concepts such as on-screen text, information field, font, color, on-screen position, etc. These universal concepts allow for a capture of multiple platform user interface definitions into a single generic format. In addition, the invention can be used to generate a graphical user interface for a program created using the business rule extraction described in the copending application Ser. No. 09/245,002 entitled "A Method And System Of Business Rule Extraction From Existing Applications For Integration Into New Applications," to which this application is related.

In accordance with the invention, each screen-bound program from a legacy system is processed using parsing techniques, which are conventional and well known to those of ordinary skill in the art, to capture its interactions, i.e., events, with the corresponding user interface screens. These events can be detected by examining the program interactions with the contents of the screens, as well as explicitly defined events through constructs such as "PF" keys or "ENTER" key.

A facility is constructed, which presents the information from the above two steps in a generic format with facilities for modifications of the definitions. The modification facility is deployed to redefine the legacy application or other application user interface using modern graphical user interface (GUI) based techniques. The alterations are provided for both visual layout and content, as well as for interface behavior.

More particularly, all of the above is enhanced using extended abilities of GUI-based user interfaces as compared to legacy or similar text-based capabilities. Examples of such enhanced facilities are enriched color, font, and graphics support, as well as new event triggering mechanisms such as push buttons and menus. The redefined legacy user interface is then transformed both as to visual layout and contents as well as interface behavior, into the new platform language, for example, Visual Basic, HTML, Java or C++. The translated user interface definition is syntactically and semantically correct and accurately captures the business behavior of the redefined legacy user interface. "Syntactically" and "semantically" correct as discussed herein with respect to the user interface means exactly the same as previously described with respect to business rule extraction.

Thereafter, the transformed user interface can be further enhanced in the target integrated development environment to reflect new business requirements. The transformed user interface is then integrated into the new application, or into the old application. With respect to new applications, component object models like CORBA, COM/DCOM and Enterprise Java Beans, are best suited for connecting the new user interface into modern technical infrastructure.

Turning now to FIG. 1, there is generally shown a process flow diagram illustrating how all user interfaces related to a legacy application are detected for recreating a user interface with the same functionality in a graphical user interface environment. For example, a user event in a legacy application may be the depressing of a key or a particular selection performed on a screen.

In accordance with the invention as illustrated in FIG. 1, there is provided a combination of process steps and means used to accomplish the goal of porting the application's user interface to a new graphical user interface environment.

At a first step 11, a graphical editor is used to look at a structure of the data in a BMS screen, i.e., a file describing a CICS screen, or in an MFS screen, i.e., a file describing a IMS screen, and to match its pattern or field of the data to the pattern or field of the data structure in the program which communicates with the screen.

Figure 2:
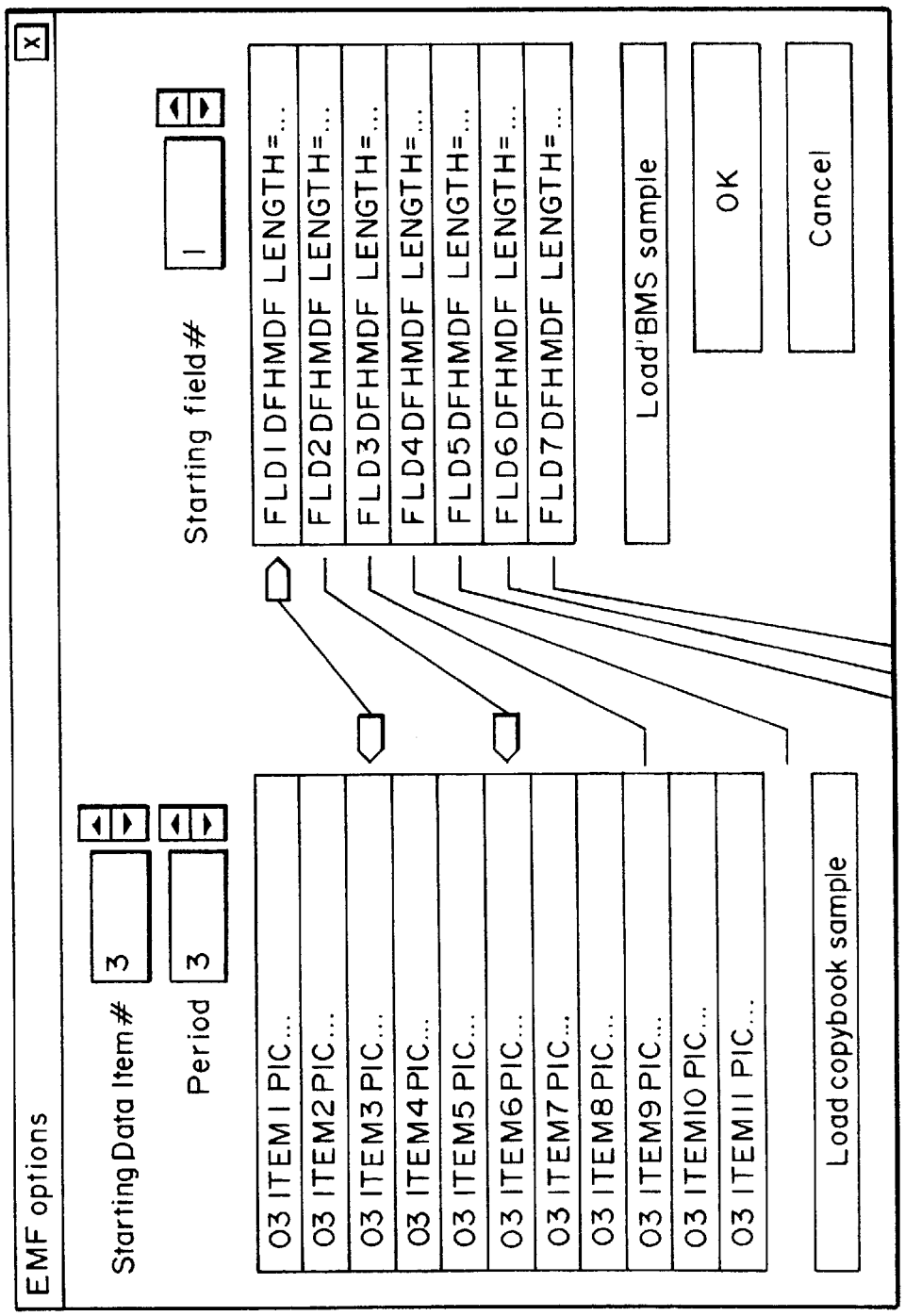
FIG. 2 illustrates in screen display form the step of field matching of FIG. 1.

An illustration of such pattern or field matching is further illustrated in FIG. 2 which is a view of a screen display window showing typical matches. With respect to the type of graphical editor which can be used to accomplish this step is the graphical editor program sold under the name Hyperview™ by Relativity Technologies of Cary, N.C. as part of its RescueWare™ software offering. While specific reference to a product tool has been made, implementation of the invention is not limited to this tool. Any conventional tool developed, or easily developed, for example, a syntax based editor can be used in place of the noted tool. For purposes herein, a syntax based editor is an editor that recognizes particular syntax constructs of a language. For example, such an editor may display an outline of the program or it may colorize verbs and variables in different colors. Another example of such a tool is one marketed and made available under the name Visual Developer Studio 97™, available commercially from Microsoft Corporation of Redmond, Wash.

Thus, by using such a graphical editor, one can create a one to one correspondence between the fields on the screen and the corresponding fields in the program. Once the pattern matching is accomplished, it may be generally used for every screen and program in the application. The graphical editor then can provide a default pattern matching which applies to most of the situations encountered.

Figure 3:
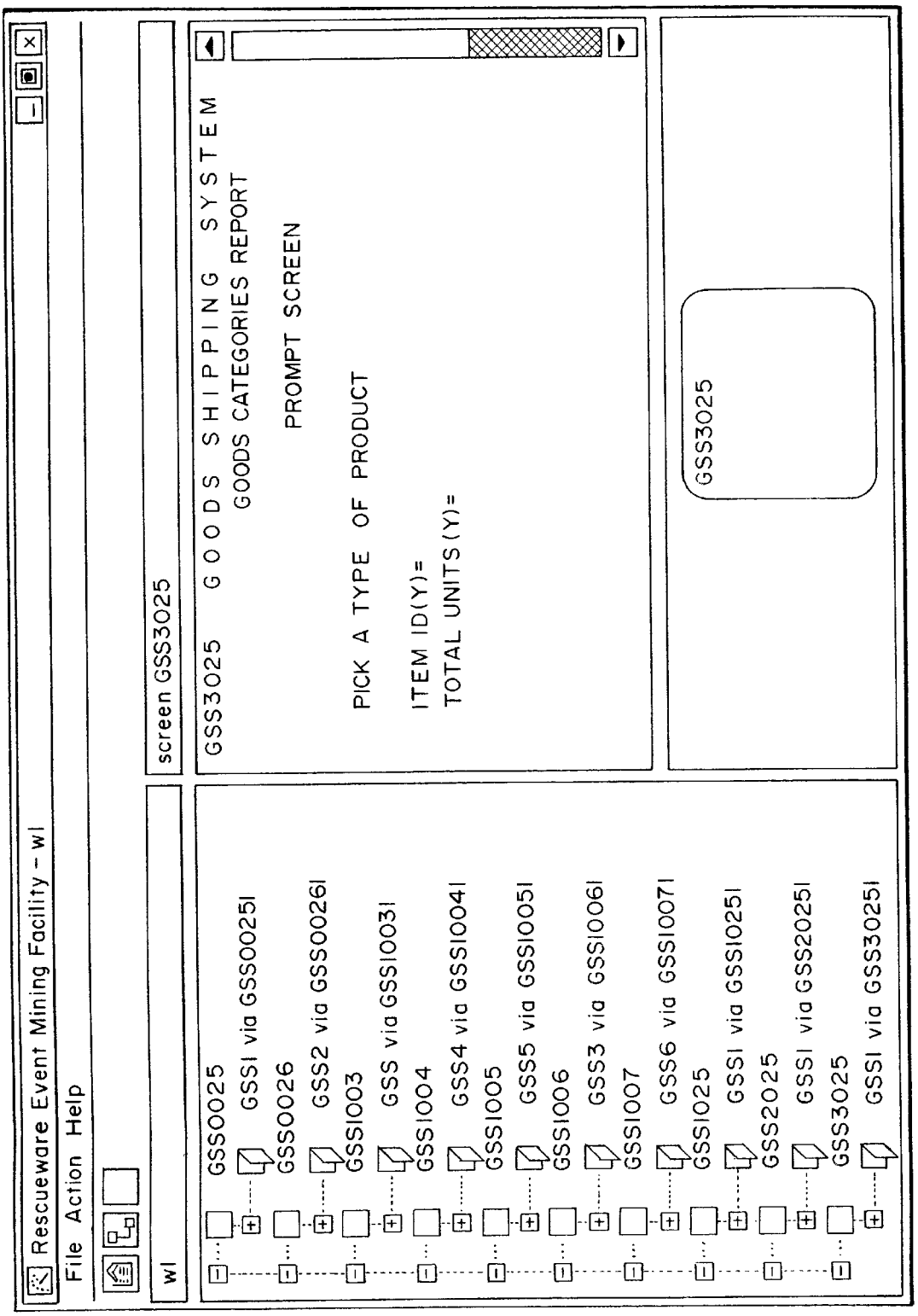
FIG. 3 and FIG. 4 illustrate in screen display form the steps of event mining and searching for events of FIG. 1.

Thereafter, based on the matching pattern and other information extracted from programs and screens, event mining is conducted at step 43 which results in a screen display as shown in FIG. 3. By "event mining" is meant detection of which programs communicate with which screens, and for a given program/screen pair, the exact correspondence between fields on this particular screen and this particular program. Finally, event mining also provides for each screen field that is detected, all the "IF" or "EVALUATE" statements where the field is compared with the other fields or literal values.

Figure 4:
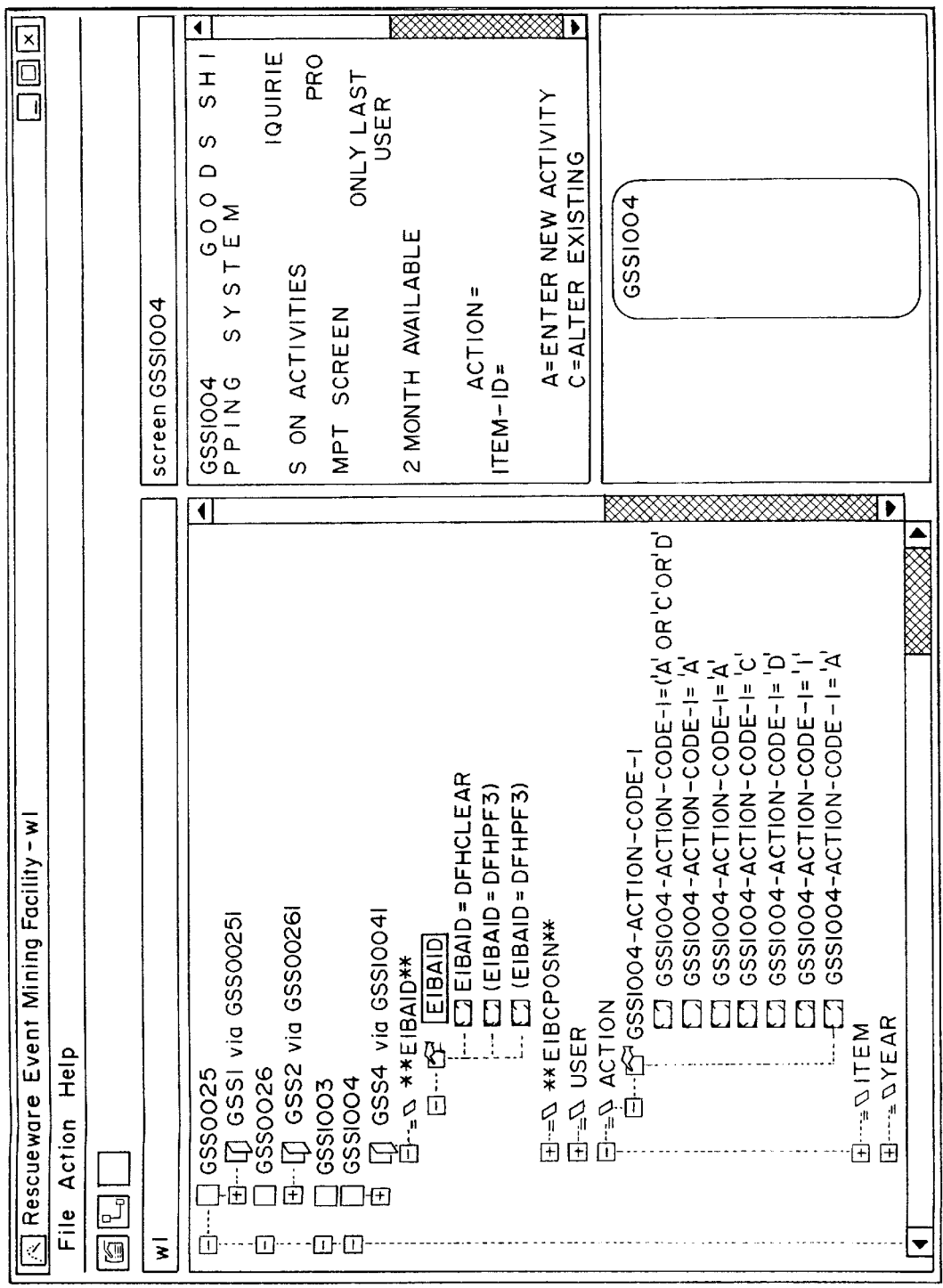

A search for events is then conducted as step 45 and events identified as shown in the screen display of FIG. 4. The above discussed information is presented to the user on a window in a display, where more analysis can be performed. On this window, the user can see the image of the screen and the program code. The user can navigate from screen fields to their declaration in the program code and to the "IF" or "EVALUATE" statements where the fields are used.

The user can look for those fields which represent events. Not all fields are associated with events. For instance, entering a customer name in a field is not considered a user event. However, if the end-user presses PF3 to cancel the screen, this action is an event. If the end-user enters a code C for customer screen or code P for the products screen, this is an event. In this last case, lines are identified in the program where the selection code is compared with value C or D inside an IF or EVALUATE statement. These lines have already been discovered during the event mining step 43 (FIG. 3), and the right ones are selected.

Figure 5:
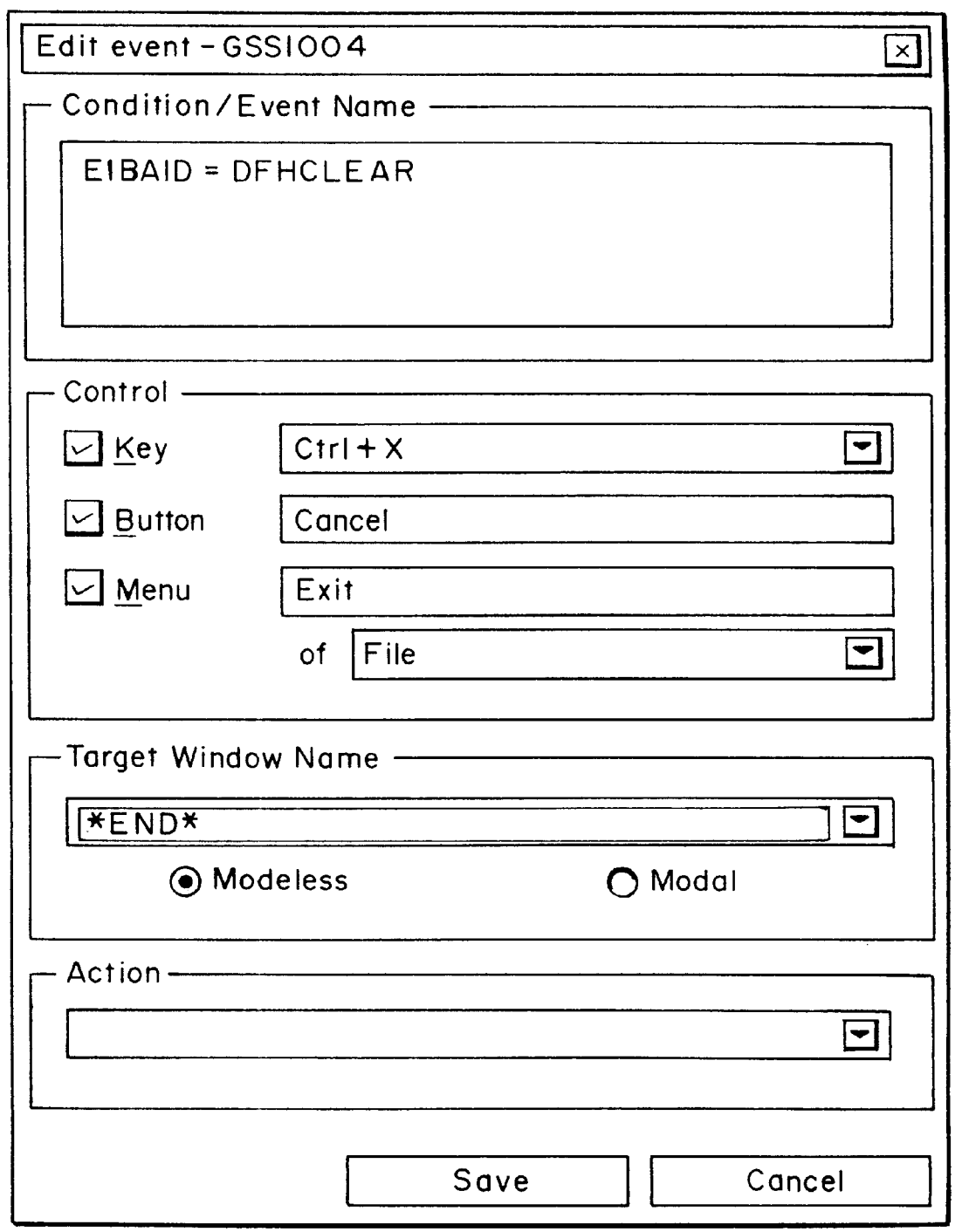
FIG. 5 illustrates in screen display form the step of identifying graphical user interface definitions of FIG. 1.

The graphical user interface (GUI) definitions are specified at step 47 as further illustrated in the screen display of FIG. 5. Once the user event is discovered, the event is selected by pointing to the line of code where the comparison is made. The user is prompted with the event definition window. On this window, the user specifies a number of items. Specifically, the type of GUI control to be used is identified and specified, i.e., push button, menu, or function key. Further, the text appearing on the menu or push button is also specified. In addition, the result of the event is also specified. The result may be a transition to another screen in the application, or the performing of a routine while the screen remains the same, or the unloading of the screen (the screen is canceled) or the ending of the whole application.

Thereafter, the graphical user interface is generated at step 49 in a conventional manner well known to those of ordinary skill in the art. Once all of the events are discovered and given a GUI definition, the user regenerates the application interface in a new environment. The target environments are in accordance with current platforms: Visual Basic; HTML; C++; and Java. In the new implementation, the end user may perform the same actions as in the same legacy application, although the interface is modernized to utilize GUI controls. The generated interface does not contain any application logic or data access. This may be added later by programmers rebuilding the application.

As may be appreciated, since all that is done is to generate a new graphical user interface, with no specific functionality dedicated the underlying legacy application, the new graphical user interface may be deployed with the existing legacy application or other existing legacy applications, or on a new application such as that which may be generated through the business rule extraction method and system described in the copending application previously referred to herein.

Having thus described the invention in detail, the same will become better understood from the appended claims in which it is set forth in a nonlimiting manner.

What is claimed is:

1. A method of recreating a user interface of an existing application screen into a graphical user interface having the same functionality of the original user interface, comprising:
    a) matching the structure of data in a user interface of an existing application to a pattern of data structure in the application which communicates with the screen;
    b) detecting which portions of the existing program communicates with each screen of the user interface of the existing application;
    c) detecting the correspondence between fields of a specific screen and the portion of the program which communicates with the specific screen;
    d) detecting for each screen field, statements where the field is compared with other fields and literal values;
    e) display the detected information of steps (b), (c) and (d) and determining therefrom which fields represent events;
    (f) specify the type of graphical user interface control to be used for each event, the text appearing on the graphical user interface for each control specified, and the result of the event, wherein the result of the event specified is at least the performing of a routine while the screen remains the same; and
    (g) regenerate the application's user interface as a graphical user interface.

2. A method as in claim 1 wherein said graphical user interface control specified is a push button.

3. A method as in claim 1 wherein said graphical user interface control specified is a menu.

4. A method as in claim 1 wherein said graphical user interface control specified is a function key.

5. A method as in claim 1, wherein the result of the event specified further comprises the transition to another screen.

6. A method as in claim 1, wherein the result of the event specified further comprises the performing of a routine while the screen remains the same.

7. A method as in claim 1, wherein the result of the event specified further comprises the unloading of the screen.

8. A method as in claim 1, wherein the regeneration of the user interface is done in a Visual Basic environment.

9. A method as in claim 1, wherein the regeneration of the user interface is done in one of an HTML and JAVA environment.

10. A method as in claim 1, wherein the regeneration of the user interface is done in a C++.

11. A system for recreating a user interface of an existing application screen into a graphical user interface having the same functionality of the original user interface, comprising:
    a) means for matching the structure of date in a user interface of an existing application to a pattern of data structure in the application which communicates with the screen,
    b) means for detecting which portions of the existing program communicates with which screens of the user interface of the existing application;
    c) means for detecting the correspondence between fields of a specific screen and the portion of the program which communicates with the specific screen;
    d) means for detecting for each screen field, statements where the field is compared with other fields and literal values;
    e) a display for displaying the detected information which is detected by the means of (b), (c) and (d), and determining from said display of said detected information which fields represent events;
    f) means for specifying the type of graphical user interface control to be used for each event, the text appearing on the graphical user interface for each event specified, and the result of the event, wherein the result of the event specified is at least the performing of a routine while the screen remains the same; and
    g) means for regenerating the application's user interface as a graphical user interface.

12. A system as in claim 11 wherein said graphical user interface control specified is a push button.

13. A system as in claim 12 wherein said graphical user interface control specified is a menu.

14. A system as in claim 12 wherein said graphical user interface control specified is a function key.

15. A system as in claim 11 configured wherein said result of the event specified further comprises a transition to another screen.

16. A system as in claim 15 configured wherein said result of the event specified further comprises performing of a routine while the screen remains the same.

17. A system as in claim 15 configured wherein said result of the event specified further comprises the unloading of the screen.

18. A system as in claim 11 wherein said means for regenerating is for regenerating the user interface in a Visual Basic environment.

19. A system as in claim 11 wherein said means for regenerating is for regenerating the user interface in one of an HTML and Java environment.

20. A system as in claim 11 wherein said means for regenerating is for regenerating the user interface in a C++ environment.

21. A method of recreating a user interface of an existing application screen into a graphical user interface having the same functionality of the original user interface, comprising:
   a) matching the structure of date in a user interface of an existing application to a pattern of data structure in the application which communicates with the screen,
   b) detecting which portions of the existing program communicates with each screen of the user interface of the existing application;
   c) detecting the correspondence between fields of a specific screen and the portion of the program which communicates with the specific screen;
   d) detecting for each screen field, statements where the field is compared with other fields and literal values;
   e) display the detected information which is detected by the means of (b), (c) and (d), and determining therefrom which fields represent events;
   f) specify the type of graphical user interface control to be used for each event, the text appearing on the graphical user interface for each event specified, and the result of the event, wherein the result of the event specified is at least the unloading of the screen; and
   g) regenerate the application's user interface as a graphical user interface.

22. A method as in claim 21 wherein said graphical user interface control specified is a push button.

23. A method as in claim 21 wherein said graphical user interface control specified is a menu.

24. A method as in claim 21 wherein said graphical user interface control specified is a function key.

25. A method as in claim 21 wherein said result of the event specified further comprises the transition to another screen.

26. A method as in claim 21 wherein the regeneration of the user interface is done in a Visual Basic environment.

27. A method as in claim 21 wherein the regeneration of the user interface is done in one of an HTML and Java environment.

28. A method as in claim 21 wherein the regeneration of the user interface is done in a C++ environment.

29. A system for recreating a user interface of an existing application screen into a graphical user interface having the same functionality of the original user interface, comprising:
   a) means for matching the structure of data in a user interface of an existing application to a pattern of data structure in the application which communicates with the screen,
   b) means for detecting which portions of the existing program communicates with which screens of the user interface of the existing application;
   c) means for detecting the correspondence between fields of a specific screen and the portion of the program which communicates with the specific screen;
   d) means for detecting for each screen field, statements where the field is compared with other fields and literal values;
   e) a display for displaying the detected information which is detected by the means of (b), (c) and (d), and for determining from said display of said detected information which fields represent events;
   f) means for specifying the type of graphical user interface control to be used for each event, the text appearing on the graphical user interface for each event specified, and the result of the event, wherein said result of the event specified is at least the unloading of the screen; and
   g) means for regenerating the application's user interface as a graphical user interface.

30. A system as in claim 29 wherein said graphical user interface control specified is a push button.

31. A system as in claim 29 wherein said graphical user interface control specified is a menu.

32. A system as in claim 29 wherein said graphical user interface control specified is a function key.

33. A system as in claim 29 configured wherein said result of the event specified further comprises a transition to another screen.

34. A system as in claim 29 configured wherein said result of the event specified further comprises the performing of a routine while the screen remains the same.

35. A system as in claim 29 wherein said means for regenerating is for regenerating the user interface in a Visual Basic environment.

36. A system as in claim 29 wherein said means for regenerating is for regenerating the user interface in one of an HTML and Java environment.

37. A system as in claim 29 wherein said means for regenerating is for regenerating the user interface in a C++ environment.

* * * * *

UNITED STATES PATENT AND TRADEMARK OFFICE
CERTIFICATE OF CORRECTION

PATENT NO.     : 6,346,953 B1
DATED          : February 12, 2002
INVENTOR(S)    : Len Erlikh, Ioan M. Oara, Mikhail Bulyonkov, Audrey N. Terekov, Vivek Wadhwa and Jaideep Mirchandani It is certified that error appears in the above-identified patent and that said Letters Patent is hereby corrected as shown below:

<u>Title page,</u>
The inventors named on the first page of the patent should include -- Jaideep Mirchandani, Chapel Hill, NC (US) --;

<u>Column 6,</u>
Line 18, change "date" to -- data --;

<u>Column 7,</u>
Line 4, change "date" to -- data --.

Signed and Sealed this

Fifteenth Day of October, 2002

*Attest:*

*Attesting Officer*

JAMES E. ROGAN
*Director of the United States Patent and Trademark Office*